(12) United States Patent
White (10) Patent No.: US 6,901,589 B2
(45) Date of Patent: May 31, 2005

(54) SYSTEM AND METHOD FOR DETERMINING A ROOT CAUSE OF A FAILURE

(75) Inventor: Calvin White, Calgary (CA)

(73) Assignee: Wind River Systems, Inc., Alameda, CA (US)

( * ) Notice: Subject to any disclaimer, the term of this patent is extended or adjusted under 35 U.S.C. 154(b) by 454 days.

(21) Appl. No.: 09/888,955

(22) Filed: Jun. 25, 2001

(65) Prior Publication Data

US 2003/0009751 A1 Jan. 9, 2003

(51) Int. Cl.[7] .................................................. G06P 9/44
(52) U.S. Cl. ...................... 717/166; 711/148; 711/111; 711/118; 711/129
(58) Field of Search ................................ 717/124–166; 711/111–148; 707/1–7

(56) References Cited

U.S. PATENT DOCUMENTS

| 5,815,718 A | * | 9/1998 | Tock ........................... 717/166 |
| 5,966,702 A | * | 10/1999 | Fresko et al. ................... 707/1 |
| 6,339,841 B1 | * | 1/2002 | Merrick et al. ............. 717/166 |

* cited by examiner

*Primary Examiner*—Tuan Dam
*Assistant Examiner*—Chuck Kendall
(74) *Attorney, Agent, or Firm*—Fay Kaplun & Marcin LLP (57) ABSTRACT

A system, comprising a receiving module to receive a request to load a component, a stack to record the request and a loader to fulfill the request, wherein when the request has been fulfilled the request is removed from the stack and when the loading of the component is unsuccessful, contents of the stack are made available to a user to indicate the unsuccessfully loaded component.

24 Claims, 6 Drawing Sheets

SYSTEM AND METHOD FOR DETERMINING A ROOT CAUSE OF A FAILURE

BACKGROUND INFORMATION

Many devices such as personal computers ("PCs"), personal digital assistants ("PDAs"), embedded devices, etc., contain applications and software that need to be loaded for the device to accomplish the functions requested by a user. This software may be loaded in various stages into, for example, a processor or temporary memory of the device. For example, software that provides basic services to the device may be loaded during the boot process so that these services are immediately available to the device, whereas other software may be loaded on an as needed basis depending on requests made by the user. Individual software components may be loaded in whole or in part onto the device.

The different stages of software component or sub-component loading may be dependent upon the loading of other software components or sub-components. In certain instances, software components may fail to load correctly. When a software component fails to load correctly, the user may receive an indication that the software component did not load correctly, but not an indication as to the reason for the failure in the loading of the software component.

SUMMARY OF THE INVENTION

A system, comprising a receiving module to receive a request to load a component, a stack to record the request and a loader to fulfill the request, wherein when the request has been fulfilled the request is removed from the stack and when the loading of the component is unsuccessful, contents of the stack are made available to a user to indicate the unsuccessfully loaded component.

Furthermore, a method of loading software modules, comprising the steps of receiving a request to load a first software module, placing a representation of the first software module onto a stack, determining if the first software module is dependent on a second software module, placing, when the first software module is dependent on the second software module, a representation of the second software module onto the stack, loading the second software module, removing the representation of the second software module from the stack when the second software module has been successfully loaded, loading the first software module and removing the representation of the first software module from the stack when the first software module has been successfully loaded.

DETAILED DESCRIPTION

The present invention may be further understood with reference to the following description of preferred exemplary embodiments and the related appended drawings, wherein like elements are provided with the same reference numerals. It should be understood that the present invention may be implemented on any processor or controller based device such as PCs, servers, PDAs, embedded devices, etc. (and development platforms for the same), and the term devices will be used throughout this description to generically refer to all such devices. The exemplary embodiment of the present invention is also described using the terms load, loading and loaded. The equivalent terms resolve, resolving and resolved are sometimes used interchangeably by those skilled in the art. Additionally, the preferred embodiment of the present invention will be described with reference to class loaders for Java® applications. Those skilled in the art will understand that the present invention is not limited to class loading in Java® applications, but may be implemented to determine the root cause of loading failures of modules for any software component.

Figure 1:
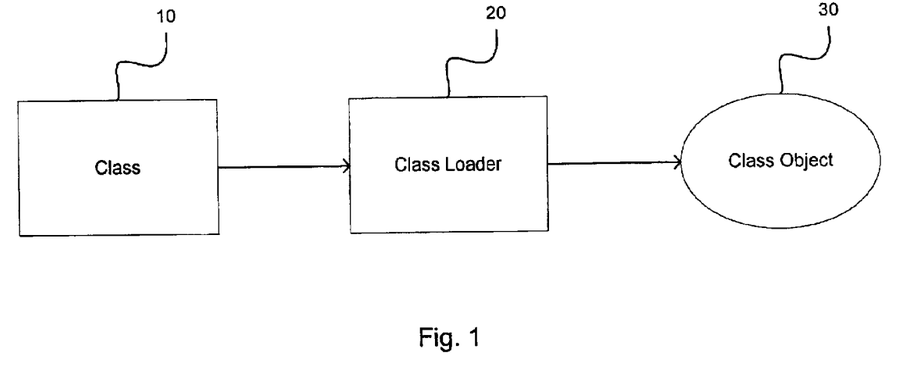
FIG. 1 shows an exemplary block diagram showing the creation of a class object from a class using a class loader according to the present invention.

FIG. 1 shows an exemplary block diagram illustrating the creation of class object 30 from class 10 using class loader 20. Class 10 is the basic unit of object orientation in Java and may be considered a blueprint for class object 30. Those skilled in the art will understand that the present description is describing a single class, class loader and class object, but that there may be multiple classes, class loaders and class objects in a software component. Class 10 allows the software developer to define all the properties and methods that internally define class object 30, all the application program interface ("API") methods that externally define class object 30 and all the syntax necessary for handling other features of class object 30. Class 10 is generally stored in the form of byte code and may be stored on the device in, for example, a hard drive or flash memory, or may also be stored externally from the device, for example, on a network storage device accessible via a network. Class loader 20 is responsible for finding the byte code for class 10 when an execution module, for example, the Java Virtual Machine ("JVM") needs to load class 10. As is well known, the JVM is a virtual computing environment implemented in software on top of the device hardware and operating system to run compiled Java programs. Class loader 20 may itself be considered an object that can be managed by the JVM. When class loader 20 finds class 10, it reads in the byte code for class 10 to create or instantiate class object 30 which is used by the JVM to run the program. As described above, class 10 functions as a blueprint for class object 30 which becomes the actual object which is stored in the device memory. Class object 30 may then utilize the methods and APIs defined by class 10.

Class loader 20 may be a primordial or default class loader generally responsible for loading essential functions into the JVM. The primordial class loader may also load classes from a classpath defined by the user or developer. The primordial class loader is limited in this manner for a variety of reasons including, for example, security issues relating to loading classes from untrusted sources. However, most developers and/or users find this too limiting and want to load, during runtime, new classes that are not on the predefined classpath. To accomplish this goal, developers write their own class loaders which may be referred to as custom class loaders. In the example described above, class loader 20 may be a primordial class loader or a custom class loader. Some examples of custom class loaders include, applet class loaders, secure class loaders, remote method invocation ("RMI") class loaders, etc. These custom class loaders may search, find and load classes from virtually any location or type of file. For example, the classes may be located in a database which is on the device itself or may be located on a network and accessed via a uniform resource locater ("URL") link. Thus, a single device may contain multiple custom class loaders in addition to the primordial class loader. Those skilled in the art will understand that the system and method of the present invention will be described with reference to a custom class loader. However, the present invention may be implemented in the primordial or default class loader.

Figure 2:
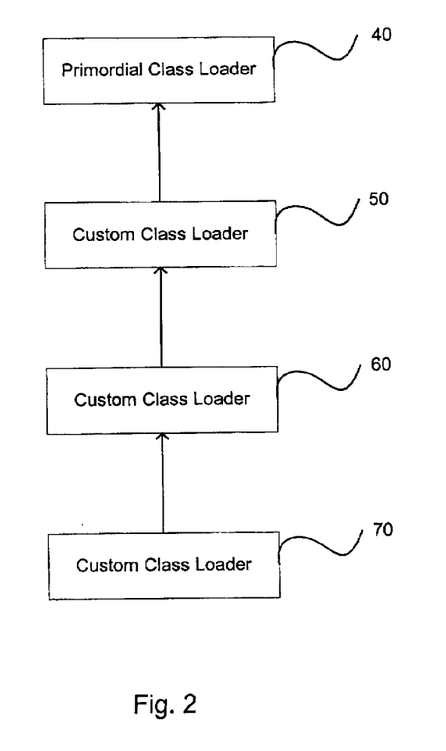
FIG. 2 shows an exemplary hierarchical relationship between multiple class loaders according to the present invention.

An issue that may arise with multiple class loaders is that there may be similarly named classes or the same classes may be stored in different locations. It is desirable to load the correct class or the class from its primary location and not have multiple class loaders loading the same class. For example, if a class is on a predefined classpath and the primordial class loader is loading the class, the developer does not want a custom class loader to load that class from a different location. It is possible to create a hierarchical relationship between the multiple class loaders so that such a conflict does not occur. FIG. 2 shows an exemplary hierarchical relationship between multiple class loaders 40–70. Those of skill in the art will understand that the entire set of class loader 40–70 may be referred to as a loader or class loader and then each of the individual loaders may be referred to as loading modules. In this relationship primordial class loader 40 is the ultimate parent class loader to each of custom class loaders 50–70. Primordial class loader 40 is the ultimate parent because it is the default class loader for the JVM and if primordial class loader 40 can load a particular class (e.g., that class is on the predefined classpath), it will load the class. The order of the remaining custom class loaders 50–70 may be determined by the software developer based on, for example, device requirements. This order also denotes a parent-child relationship between the custom class loaders 50–70. For example, custom class loader 50 is a parent to custom class loader 60 which, in turn, is a parent to custom class loader 70. Those skilled in the art will understand that the hierarchical relationship described with respect to FIG. 2 may be nested to any number of levels based on the number of class loaders included in a software component. The hierarchical relationship between the class loaders allows the correct class loader to load a particular class.

Figure 3:
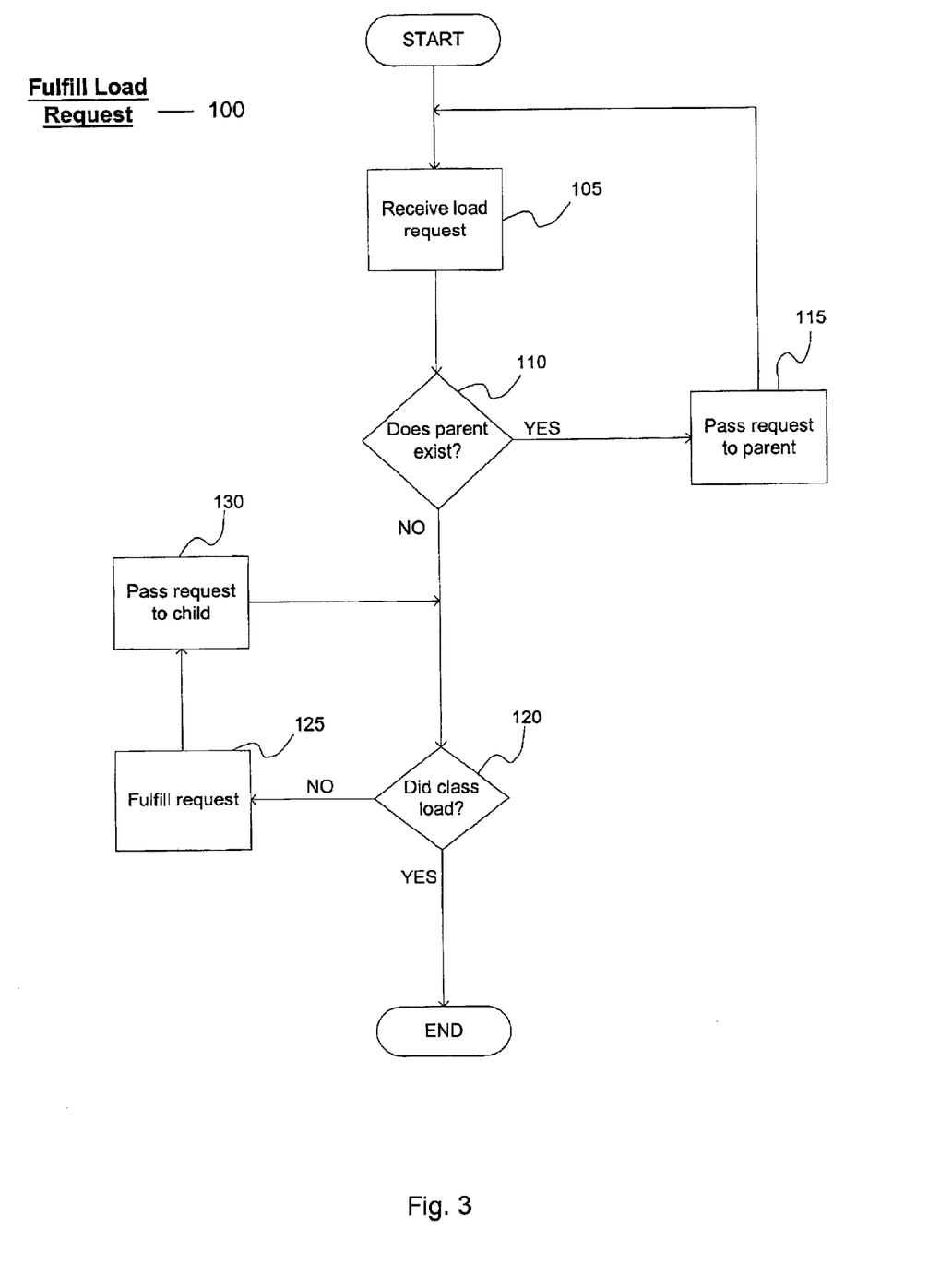
FIG. 3 shows an exemplary process for fulfilling a request to load a class using the hierarchical relationship between class loaders according to the present invention.

FIG. 3 shows an exemplary process 100 for fulfilling a request to load a class using the hierarchical relationship between class loaders. In step 105 a class loader receives a request to load a class. For example, there may be a request to custom class loader 70 to load a class. The request to load a class may come from the portion of software code that is currently being executed on the device. The portion of software code that is currently being executed is part of a class and any requests for a class made by that portion of software code will go to the class loader that loaded the class containing the currently executing portion of software code. Before custom class loader 70 fulfills this request, it determines whether any other class loader which is at a higher level (e.g., class loaders 40–60) can fulfill the request. In step 110, the class loader that received the request determines whether it has a parent. If the class loader has a parent, the process continues to step 115 where the class loader that received the request passes the request to its parent. The process then continues back to step 105 where the parent receives the request and determines whether it has a parent class (step 110). Thus, in the example started above, the first request is received by custom class loader 70 which determines that it has a parent (custom class loader 60) and passes the request to that parent. Similarly, custom class loader 60 determines that it has a parent (custom class loader 50) and passes the request to that parent. Thus, the process continues to loop until the request is passed to primordial class loader 40 at which point no parent class loader exists in step 110. The process then continues to step 120 to determine whether the requested class has loaded. The first time the process reaches step 120, the requested class cannot have loaded because none of the class loaders have yet attempted to load the requested class. Therefore, the process continues to step 125 where the current class loader attempts to fulfill the request. A class loader can fulfill a request if it is capable of finding the requested class. In the example started above, primordial class loader 40 will be the first class loader to attempt to load the requested class.

After the current class loader has attempted to load the requested class, the request is passed back to the next lowest class loader in step 130. For example, after primordial class loader 40 has attempted to load the requested class, the request is then passed back to custom class loader 50. The process then loops to step 120 to again determine if the class has loaded. When the process reaches step 120 for a second time, it is possible that the requested class has been loaded. For example, if primordial class loader 40 was capable of loading the requested class in step 125, custom class loader 50 would determine that the requested class has been loaded in step 120. If the class has been loaded the process ends. However, if the class has not been loaded the process again continues to step 125 where the current class loader attempts to load the requested class. In this example, custom class loader 50 would attempt to fulfill the request. After the attempt to fulfill the request was made, the process then continues to step 130 where the request is passed to the next lowest class loader (e.g., custom class loader 60). The process continues to loop until the requested class is loaded.

Figure 4:
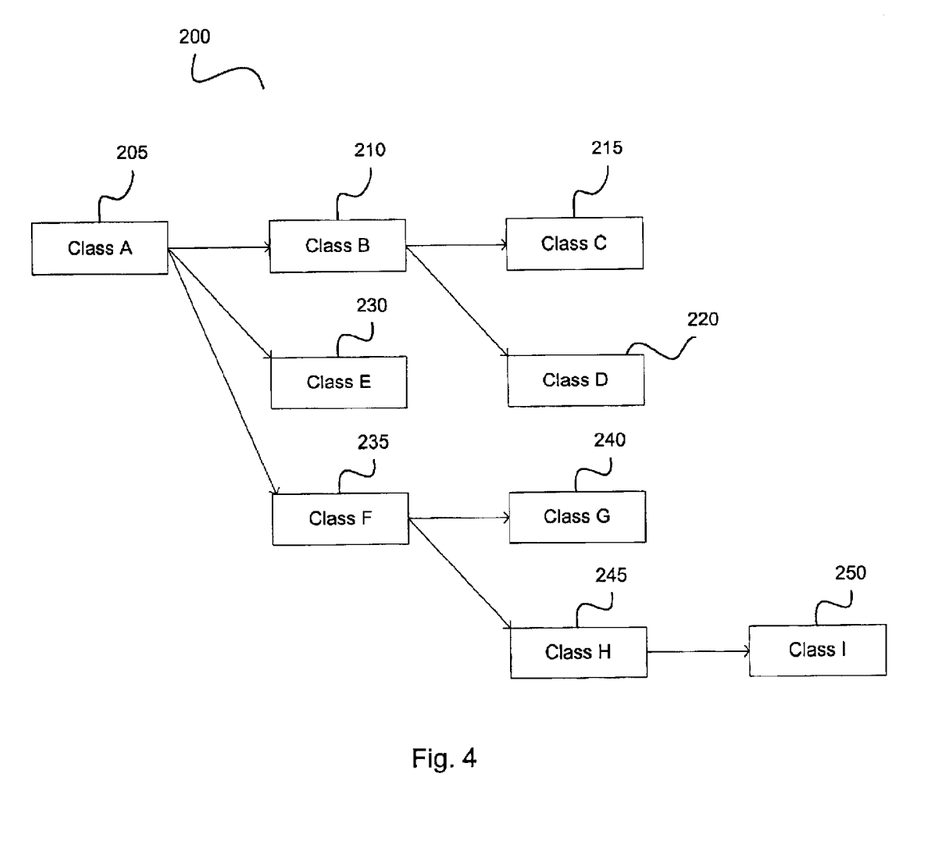
FIG. 4 shows an exemplary class loading scenario having multiple dependencies between classes.

Classes may be dependent upon other classes and therefore these other classes may need to be loaded prior to the loading of the originally requested class. The classes which a requested class are dependent on may be included in the class definition or information. Thus, when a class loader receives a request to load a class, the class definition includes the dependent classes. FIG. 4 shows an exemplary class loading scenario 200 having multiple dependencies between classes 205–250. In this exemplary scenario 200, the originally requested class to load was class A 205. However, class A 205 is dependent upon three other classes, class B 210, class E 230 and class F 235. Thus, before class A 205 may be loaded, each of class B 210, class E 230 and class F 235 must be loaded. Similarly, class B 210 is dependent on class C 215 and class D 220. Class F 235 is dependent on class G 240 and class H 245 which is, in turn, dependent on class I 250. Therefore, class A 205 cannot be loaded until all of classes B-I 210–250 have been loaded. If any of classes B-I 210–250 do not load properly, class A 205 will not load properly. For example, if class E 230 does not load correctly, class A 205 will not load because it is dependent on class E 230. If the developer receives only an indication that class A 205 did not load correctly, the developer may not know the ultimate reason for the failure in the loading of class A 205.

The exemplary embodiment of present invention allows developers to easily determine the root cause for failure in the loading of classes through the implementation of a class loader containing a stack. As described above, developers may define custom class loaders to include any number of features. The exemplary embodiment of the present invention is implemented via a custom class loader in the form of a stack. Those skilled in the art will understand that the present invention may also be implemented in the primordial or default class loader. The stack keeps track of classes as they are loaded by the class loader. The stack will contain a complete history of the loading scenario for requested classes that have failed to load. In this manner, the developer will know which class or classes caused the loading failure. Those skilled in the art will understand that the implementation of the stack in a class loader is only exemplary. A stack, as will be described in greater detail below, may be implemented in any software application as either a component of the software application or as a stand alone software application that may be used in conjunction with other applications (e.g., a software development suite such as the WindStorm® software product available from Wind River Systems, Inc. of Alameda, Calif.).

Figure 5:
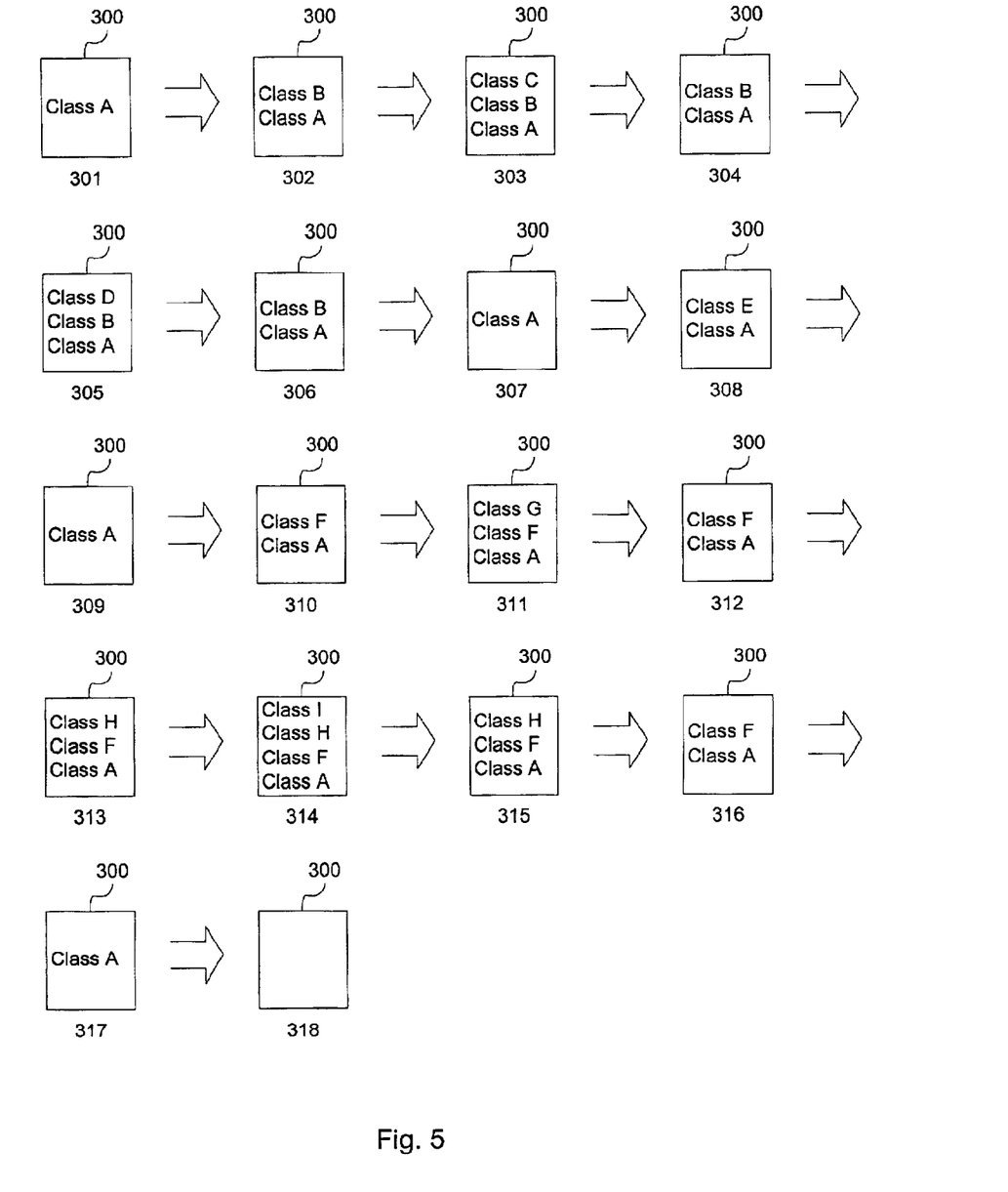
FIG. 5 shows an exemplary stack in different stages as the exemplary loading scenario of FIG. 4 is carried out in the device according to the present invention.

FIG. 5 shows an exemplary stack 300 in different stages 301–318 as the exemplary loading scenario 200 of FIG. 4 is carried out in the device. As described above, in exemplary scenario 200, class A 205 is the originally requested class. In the exemplary embodiment of the present invention the adding of a representation of a class to a stack is referred to as "pushing" a class onto the stack and removing a representation of a class from a stack is referred to as "popping" a class off the stack. In the exemplary embodiment described below, the representation of the class is the class name. However, any representation that uniquely identifies a class may be used for the representation. Thus, when the request for class A 205 is received, the class loader pushes the name of class A 205 onto stack 300 (stage 301). As described above, stack 300 may be considered part of the class loader and may be stored, for example, in random access memory ("RAM") during the class loading procedure. Stack 300 may be implemented, for example, in the form of an array, table, scalar, database entry, text file, etc. Since class A 205 is dependent on class B 210, a request is made to load class B 210, and the class loader pushes class B 210 onto stack 300 with class A 205 (stage 302). Similarly, since class B 210 is dependent on class C 215, a request is made to load class C 215, and the class loader pushes class C 215 onto stack 300 (stage 303). Class C 215 is not dependent on any other class, therefore the class loader may load class C 215 and when class C 215 is successfully loaded, the class loader pops class C 215 off of stack 300 (stage 304). Thus, after a class has been successfully loaded it no longer appears on stack 300. Only those classes which still need to be loaded appear on stack 300.

Continuing with the example, class B 210 is also dependent on class D 220 and therefore there is a request to load class D 220, and the class loader pushes class D 220 onto stack 300 (stage 305). Since class D 220 is not dependent on any other classes, it is loaded by the class loader. When class D 220 has been successfully loaded, the class loader pops class D 220 off of stack 300 (stage 306). After both class C 215 and class D 220 have been loaded, the class loader may then load class B 210 and then pop class B 210 off of stack 300 (stage 307). Class A 205 is also dependent on class E 230 and therefore there is a request to load class E 230. The class loader pushes class E 230 onto stack 300 with class A 205 (stage 308). Class E 230 is not dependent on any other classes, therefore the class loader may load class E 230 and pop class E 230 off of stack 300 (stage 309).

Class A 205 is also dependent on class F 235 and therefore a request to load class F 235 is generated, and the class loader pushes class F 235 onto stack 300 with class A 205 (stage 310). Class F 235 is dependent on class G 240 and therefore there is a request to load class G 240, and the class loader pushes class G 240 onto stack 300 (stage 311). Class G 240 is not dependent on any other classes, therefore the class loader may load class G 240 and then pop class G 240 off of stack 300 (stage 312). Class F 235 is dependent on class H 245 and therefore a request to load class H 245 is generated, and the class loader pushes class H 245 onto stack 300 (stage 313). Class H 245 is dependent on class I 250 and therefore a request to load class I 250 is generated, and the class loader pushes class I 250 onto stack 300 (stage 314). Class I 250 is not dependent on any other classes, therefore the class loader may load class I 250 and then pop class I 250 off of stack 300 (stage 315). Since class I 250 has been loaded, the class loader may then load class H 245 and pop class H 245 off of stack 300 (stage 316). After both class G 240 and class H 245 have been loaded, the class loader may then load class F 235 and then pop class F 235 off of stack 300 (stage 317). Finally, when all of the classes that class A 205 is dependent upon have been loaded, the class loader may load class A 205 and then pop class A 205 off of stack 300 (stage 318).

In the example described above, all required classes were loaded successfully. In such a case, the actions of pushing and popping classes onto and off of stack 300 will be transparent to the developer. However, if a problem arises during the loading of any of the classes, stack 300 will be available to the developer to diagnose the root cause of the loading failure. For example, as described above in the exemplary loading scenario 200, the originally requested class to load was class A 205. The developer did not specifically request all the dependent classes 210–250 to be loaded, but rather they were requested indirectly because of the dependencies of class A 205. Thus, if one of the dependent classes 210–250 had failed to load, the developer would know that the requested class A 205 did not load. By accessing stack 300, the developer may learn the root cause of the loading failure of class A 205. For example, if class I 250 had failed to load correctly, the system may return an error message stating that the requested class A 205 had failed to load properly and may then display stack 300 in its current state. Stage 314 displays the state of stack 300 when class I 250 was requested to load and pushed onto stack 300. Stack 300 (in stage 314) indicates to the developer that the last requested class was class I 250 and therefore, class I 250 did not load correctly. It also indicates to the developer that class H 245 is dependent on class I 250, class F 235 is dependent on class H 245 and requested class A 205 is dependent on class F 235. The developer now knows that the root cause of the problems with the loading of the requested class A 205 lie in the failure of class I 250 to load. The developer also knows why class I 250 was attempting to load in the first place—because requested class A 205 is dependent on class I 250. The developer may then attempt to remedy the problems with class I 205.

As a further example, class D 220 may have failed to load correctly. The system may return an error message stating that the requested class A 205 had failed to load properly and then may display stack 300 in its current state. At the point where class D 220 is requested to load and pushed onto stack 300, the stack is in the state of stage 305. Stack 300 (in stage 305) indicates to the developer that class D 220 was the last requested class and that it did not load correctly. The failure of class D 220 to load correctly prevented class B 210 from loading correctly because it was dependent on class D 220. Finally, the requested class A 205 did not load correctly because it was dependent on class B 210. Thus, the developer knows that the root cause of the loading problem of the requested class A 205 was the failure of class D 220 to load correctly. This knowledge of the root cause of the failure, saves the developer time and resources by allowing the developer to directly address the class that is the cause of the problem. If the developer did not know the root cause of the problem, the developer would need to go through the code of the requested class A 205 to determine all its dependencies and then go through all the dependent classes to determine their dependencies. The developer would then need to troubleshoot all the classes (e.g., classes 205–250) to determine which class was causing the problem.

Figure 6:
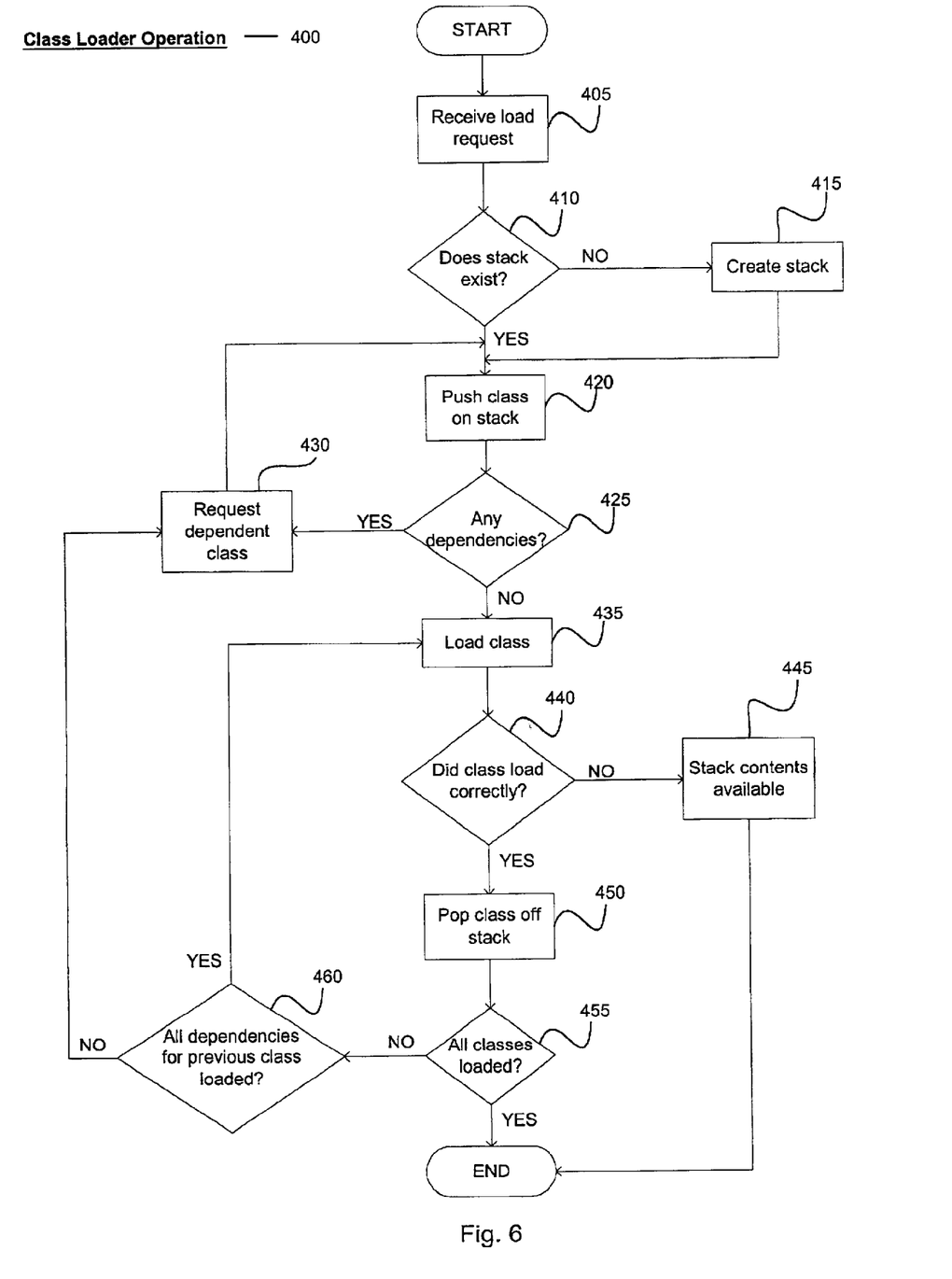
FIG. 6 shown an exemplary process for the operation of a class loader having a stack according to the present invention.

FIG. 6 shows an exemplary process 400 for the operation of a class loader working in conjunction with stack 300 which may be part of the class loader or may be a separate variable. In step 405, the class loader receives a load request, for example, load class A 205. Those skilled in the art will understand that the request may be an explicit request from the user or the developer to load a particular class or may be an indirect request through an application program or other software component. In step 410, the class loader determines whether a stack currently exists for the particular thread in which the request was made. A thread may be one of several paths or routes of execution inside a single program, routine, process or context. Threaded programs allow background and foreground actions to take place without the overhead of launching multiple processes or inter-process communication. Threading allows the sharing of a single processor between multiple tasks in a way designed to minimize the time required to switch threads. This is accomplished by sharing as much as possible of the program execution environment between the different threads so that very little state information needs to be saved and restored when changing threads. Every thread may have its own stack, and therefore, when a new thread is opened, a new stack is created for that thread. If there is no current stack for the thread on which the request was received, the process continues to step 415 where a new stack is created. After the new stack has been created in step 415 or if a stack exists for the current thread as determined in step 410, the process continues to step 420 where the requested class is pushed onto stack 300. For example, if the requested class is class A 205, the class loader will push class A 205 onto stack 300 which will be in the state as shown in stage 301 of FIG. 5. Stack 300, whether newly created in step 415 or already existing, will be empty or blank prior to the class loader pushing the requested class onto the stack.

The process then continues to step 425 where it is determined whether the requested class has any dependencies. If the requested class has dependencies, the process continues to step 430 where a request is made to load the dependent class(es). For example, if the first requested class is class A 205, in step 425 it would be determined that there are dependencies and the process would continue to step 430 where a request would be made for the first dependent class (e.g., class B 210). The process would then loop back to step 420 where the dependent class (e.g., class B 210) would be pushed on to stack 300 and the process would continue for the dependent class. If in step 425, it is determined that the current class has no dependencies, the process continues to step 435 where the load request is fulfilled by the class loader. As described above, loading a class may involve a variety of steps including those described with respect to FIG. 3. Thus, step 435 may include, for example, the entire process described with respect to FIG. 3. Each of the stacks may be implemented in such a manner that any of the class loaders on the device have access to the stacks and are free to modify the stacks by pushing a class on or popping a class off the stack. Such an implementation may be in the form of implementing the stacks as, for example, a static variable, a global variable, or other similar variable that allows access by multiple class loaders. This arrangement allows for minimal communication between different class loaders which means that developers do not have to worry about whether the custom class loader they are developing can communicate with other custom class loaders that may be loaded onto the device. For example, if the current class is class E 230 and it is determined in step 425 that class E 230 has no dependencies, in step 435 the class loader will attempt to load class E 230. However, referring to FIG. 2, the request may be received by custom class loader 60, but through the process described with respect to FIG. 3, custom class loader 50 is the actual class loader which loads class E 230. Because stack 300 is implemented in such a manner that any class loader may interact with it, custom class loader 50 may push class E 230 onto the stack and pop class E 230 off of stack 300. This means that the class loader which loads the requested class is the class loader responsible for pushing the requested class onto the stack and popping the requested class off of the stack when it is loaded correctly.

After the class loader has attempted to load the class, the process continues to step 440 to determine whether the class loaded correctly. If the class did not load correctly, the process would continue to step 445 where the system makes available (e.g., on-screen display, printout, file, etc.) to the developer stack 300. As described above, stack 300 indicates to the developer the root cause of the loading failure. The developer may then troubleshoot the appropriate software code based on the information provided by stack 300. When a class has failed to load correctly and stack 300 has been provided in step 445, the process ends and the class loader does not attempt to load any additional classes. If it is determined in step 440 that the class loaded correctly, the process continues to step 450 where the class loader pops the class off of the stack. For example, when class A 205 has been loaded correctly, the class loader pops class A 205 off of stack 300 (stages 317–318 of FIG. 5).

The process then continues to step 455 to determine whether the requested class (including all the dependent classes) have been loaded. If additional classes need to be loaded, the process continues to step 460 where the class loader determines if all dependencies for the previous class have been loaded. For example, referring to FIG. 5, after class E 230 has been successfully loaded, class A 205 is the previous class remaining on stack 300 (stages 308–309). Thus, the process continues to step 460 where it is determined whether all the dependencies of class A 205 have been loaded. In the exemplary scenario 200, class F 235 must still be loaded in order for class A 205 to be loaded. In this case, the process loops back to step 430 where the dependent class is requested (e.g., class F 235). If there were no remaining dependencies for the previous class (e.g., after class F 235 was loaded successfully), the process loops back to step 435 to load the requested class (e.g., class A 205). If in step 455, the requested class has been loaded, the process ends because all classes have been loaded successfully. Those of skill in the art will understand that stack 300 may be used for diagnostic purposes to determine the root cause of a loading failure. Thus, the operation of the stack may be disabled when the user and/or developer does not require diagnostic functions.

The following shows exemplary pseudo code for implementing portions of process 400 illustrated in FIG. 6:

```
loadClass (ClassName)
{
    getCorrectStack (CurrentThread)
    push (ClassName)
    for each dependent class
    {
        loadClass(dependency)
    }
    load (ClassName)
    if failed
    {
        print stack
        stop
    }
    pop (ClassName)
    return class
}
```

Figure 7:
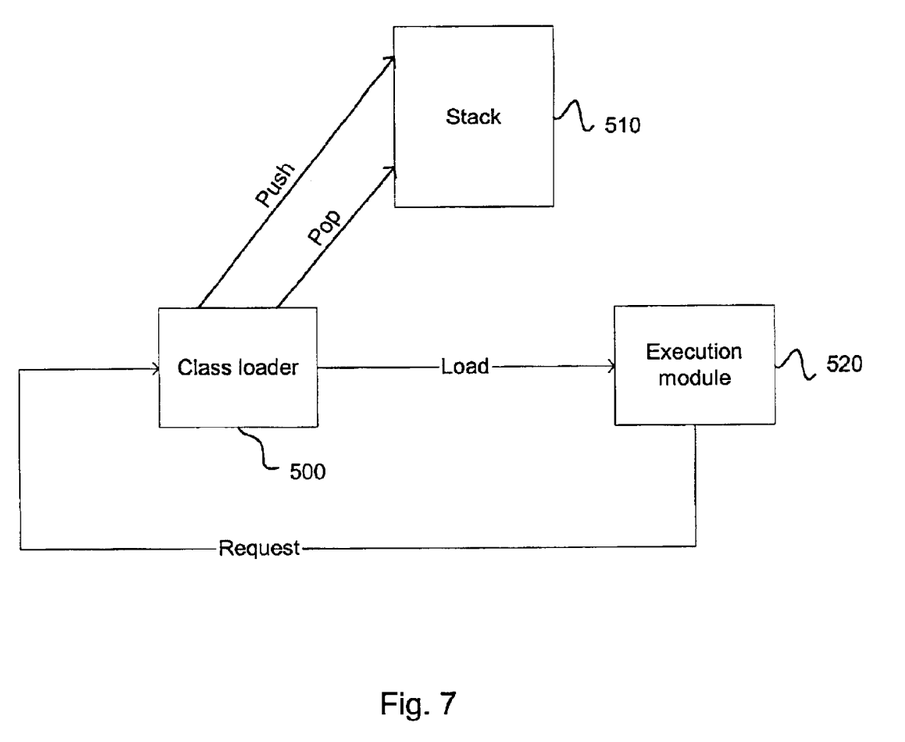
FIG. 7 shows an exemplary interaction between a class loader, a stack and an execution module according to the present invention.

FIG. 7 shows an exemplary interaction between class loader 500, stack 510 and execution module 520. As described above, a load request comes from code that is currently executing on execution module 520 which may be, for example, a Java Virtual Machine. Class loader 500 receives the load request from execution module 520 and pushes a representation of the requested class onto stack 510. Class loader 500 then attempts to load the requested class (including any dependent classes). Class loader 500 reads in the byte code from the requested class, creating a class object which includes instructions that may be executed by execution module 520. If the requested class is successfully loaded, class loader 500 pops the representation of the requested class off of stack 510. If the requested class in not loaded successfully, the contents of stack 510 are made available to the user or developer so they may determine the root cause of the failure.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system, comprising:

a receiving module to receive a request to load a component;

a stack to record the request;

a loader to fulfill the request, wherein when the request has been fulfilled the request is removed from the stack and when the loading of the component is unsuccessful, contents of the stack are made available to a user to indicate the unsuccessfully loaded component.

2. The system according to claim 1, further comprising:

an execution module to execute instructions contained in a component object, wherein the component object is created from information in the component.

3. The system according to claim 1, wherein the receiving module, the stack and the loader reside on a development platform.

4. The system according to claim 1, wherein the receiving module, the stack and the loader reside on an embedded device.

5. The system according to claim 4, wherein the component resides external to the embedded device.

6. The system according to claim 1, wherein the loader includes a plurality of loading modules in a hierarchical relationship and the component is loaded by a highest level loading module capable of loading the component.

7. The system according to claim 1, wherein the stack contents are made available to the user via one of an on-screen display, a printout and a file.

8. A method of loading, comprising the steps of:

receiving a request to load a first software module;

placing a representation of the first software module onto a stack;

determining if the first software module is dependent on a second software module;

placing, when the first software module is dependent on the second software module, a representation of the second software module onto the stack;

loading the second software module;

removing the representation of the second software module from the stack when the second software module has been successfully loaded;

loading the first software module;

removing the representation of the first software module from the stack when the first software module has been successfully loaded; and making contents of the stack available to a user when the loading of one of the first software module and the second software module has been unsuccessful.

9. The method according to claim 8, wherein the stack contents are made available to the user via one of an on-screen display, a printout and a file.

10. The method according to claim 8, wherein the representation of the first software module is the name of the first software module.

11. A system comprising:

a stack to record a load request for a software component; and a loader to receive and fulfill the load request for the software component, wherein the loader pushes a representation of the software component onto the stack when the load request is received and pops the representation of the software component off of the stack when the load request has been successfully fulfilled, wherein contents of the stack are made available to a user when fulfillment of the load request has been unsuccessful.

12. The system according to claim 11, further comprising:

an execution module to execute instructions contained in a component object, wherein the component object is created from information in the software component.

13. The system according to claim 11, wherein, when the software component in the load request is dependent on an component, an additional load request for the additional software component is received by the loader and the loader pushes a representation of the additional software component onto the stack when the additional load request is received and pops the representation of the additional software component off of the stack when the additional load request has been successfully fulfilled.

14. The system according to claim 13, wherein contents of the stack are made available to a user when fulfillment of the additional load request has been unsuccessful and the contents of the stack include the representation of the software component and the additional software component.

15. A method of loading a Java class, comprising the steps of:
- receiving a request to load a first Java class;
- placing a representation of the first Java class onto a stack;
- determining if the first Java class is dependent on a second Java class;
- placing, when the first Java class is dependent on the second Java class, a representation of the second Java class onto the stack;
- loading the second Java class;
- removing the representation of the second Java class from the stack when the second Java class has been successfully loaded;
- loading the first Java class;
- removing the representation of the first Java class from the stack when the first Java class has been successfully loaded; and
- making contents of the stack available to a user when the loading of one of the first Java class and the second Java class has been unsuccessful.

16. The method according to claim 15, wherein the stack contents are made available to the user via one of an on-screen display, a printout and a file.

17. The method according to claim 15, wherein the loading steps, the placing steps and the removing steps are performed by a Java class loader.

18. The method according to claim 15, further comprising the steps of:
- creating a first Java class object from the loaded first Java class; and
- executing instructions included in the first Java class object.

19. The method according to claim 18, wherein the executing step is performed by a Java Virtual Machine.

20. A system, comprising:
- a stack to record a load request for a Java class;
- a Java class loader to receive and fulfill the load request for the Java class, wherein the loader pushes a representation of the Java class onto the stack when the load request is received and pops the representation of the Java class off of the stack when the load request has been successfully fulfilled, wherein contents of the stack are made available to a user when fulfillment of the load request has been unsuccessful; and
- a Java Virtual Machine to execute instructions contained in a Java class object, wherein the Java class object is created from information in the Java class.

21. The system according to claim 20, wherein the Java class loader is one of a custom class loader and a default loader.

22. The system according to claim 20, wherein the stack, the Java class loader and the Java Virtual Machine reside on a development platform.

23. The system according to claim 20, wherein the stack, the Java class loader and the Java Virtual Machine reside on an embedded device.

24. The system according to claim 23, wherein the load request is received via a uniform resource locator.

* * * * *

UNITED STATES PATENT AND TRADEMARK OFFICE
CERTIFICATE OF CORRECTION

PATENT NO. : 6,901,589 B2
APPLICATION NO. : 09/888955
DATED : May 31, 2005
INVENTOR(S) : White, Calvin It is certified that error appears in the above-identified patent and that said Letters Patent is hereby corrected as shown below:

Column 4,
Line 62, "1250" should be -- I 250 --.

Column 6,
Lines 17, 18, 19, 21 and 22, "1250" should be -- I 250 --.

Column 10,
Line 61, claim 13 should read:
      13. The system according to claim 11, wherein, when the software component in the load request is dependent on an additional software component, an additional load request for the additional software component is received by the loader and the loader pushes a representation of the additional software component onto the stack when the additional load request is received and pops the representation of the additional software component off of the stack when the additional load request has been successfully fulfilled.

Column 12,
Line 32, "23" should be -- 20 --.

Signed and Sealed this

Twenty-seventh Day of June, 2006

JON W. DUDAS
*Director of the United States Patent and Trademark Office*

UNITED STATES PATENT AND TRADEMARK OFFICE
CERTIFICATE OF CORRECTION

PATENT NO.       : 6,901,589 B2
APPLICATION NO.  : 09/888955
DATED            : May 31, 2005
INVENTOR(S)      : White, Calvin Page 1 of 1

It is certified that error appears in the above-identified patent and that said Letters Patent is hereby corrected as shown below:

Column 4, line 62, "1250" should be changed to --I 250--.

Column 6, line 17, "1250" should be changed to --I 250--;

Column 6, line 18, "1250" should be changed to --I 250--;

Column 6, line 19, "1250" should be changed to --I 250--;

Column 6, line 21, "1250" should be changed to --I 250--;

Column 6, line 22, "1250" should be changed to --I 250--.

Claim 13, line 61, please insert the text --additional software-- at the beginning of line 61 so that claim 13 appears as follows:
    13. The system according to claim 11, wherein, when the software component in the load request is dependent on an <u>additional software</u> component, an additional load request for the additional software component is received by the loader and the loader pushes a representation of the additional software component onto the stack when the additional load request is received and pops the representation of the additional software component off of the stack when the additional load request has been successfully fulfilled.

Claim 24, line 32, "23" should be changed to --20--.

Signed and Sealed this

Twenty-second Day of August, 2006

JON W. DUDAS
*Director of the United States Patent and Trademark Office*